United States Patent
Gouyet et al.

(10) Patent No.: US 8,024,206 B2
(45) Date of Patent: Sep. 20, 2011

(54) TRAVEL

(75) Inventors: Albert Gouyet, Palo Alto, CA (US); Suzanne Usiskin, Palo Alto, CA (US)

(73) Assignee: AOL Inc., Dulles, VA (US)

( * ) Notice: Subject to any disclaimer, the term of this patent is extended or adjusted under 35 U.S.C. 154(b) by 1290 days.

(21) Appl. No.: 09/944,278

(22) Filed: Aug. 30, 2001

(65) Prior Publication Data
US 2003/0050805 A1 Mar. 13, 2003

(51) Int. Cl.
*G06Q 10/00* (2006.01)
(52) U.S. Cl. .......................................................... 705/5
(58) Field of Classification Search ................. 715/533; 707/5
See application file for complete search history.

(56) References Cited

U.S. PATENT DOCUMENTS

| | | | | |
|---|---|---|---|---|
| 4,862,357 A * | 8/1989 | Ahlstrom et al. | ................. | 705/6 |
| 5,408,417 A * | 4/1995 | Wilder | .............................. | 705/5 |
| 5,576,951 A * | 11/1996 | Lockwood | ...................... | 705/27 |
| 5,644,721 A * | 7/1997 | Chung et al. | ..................... | 705/6 |
| 5,732,398 A * | 3/1998 | Tagawa | ............................. | 705/5 |
| 5,832,451 A * | 11/1998 | Flake et al. | ....................... | 705/5 |
| 5,832,454 A * | 11/1998 | Jafri et al. | .......................... | 705/6 |
| 5,926,798 A * | 7/1999 | Carter | ............................. | 705/26 |
| 5,940,803 A * | 8/1999 | Kanemitsu | ......................... | 705/6 |
| 5,948,040 A * | 9/1999 | DeLorme et al. | ............. | 701/201 |
| 5,995,972 A * | 11/1999 | Allgeier | ..................... | 707/103 R |
| 6,119,094 A * | 9/2000 | Lynch et al. | ....................... | 705/5 |
| 6,457,009 B1 * | 9/2002 | Bollay | .......................... | 707/770 |
| 6,601,059 B1 * | 7/2003 | Fries | .................................... | 1/1 |
| 6,697,967 B1 * | 2/2004 | Robertson | ....................... | 714/43 |
| 6,754,581 B1 * | 6/2004 | Blachowicz et al. | ......... | 701/202 |
| 6,801,226 B1 * | 10/2004 | Daughtrey | .................... | 715/763 |
| 7,136,821 B1 * | 11/2006 | Kohavi et al. | ..................... | 705/5 |
| 2002/0078230 A1 * | 6/2002 | Hals et al. | ..................... | 709/238 |
| 2002/0156661 A1 * | 10/2002 | Jones et al. | ....................... | 705/6 |
| 2003/0040946 A1 * | 2/2003 | Sprenger et al. | .................. | 705/6 |
| 2004/0070603 A1 * | 4/2004 | Gerra et al. | .................... | 345/738 |

OTHER PUBLICATIONS www.travelocity.com, http://web.archive.org/web/19991116073012/http://www.travelocity.com/, Nov. 16, 1999.*
"The Never-Ending Quest: Searcg Engine Relevance", Notess, Greg R, Online Magazine, v 24, n3, p. 35-40 May 2000.*
http://web.archive.org/web/*/http://www.travelocity.com, Jan. 19, 2006.*
"TripleHop Recommendation Engine Makes Tailored Service Available to More Than 30 Million Leisure Travelers Through EuroVacations.com; Software Facilitates Decision Prosess." Business Wire, Apr. 23, 2001.*
"Visit the Web First Before Making Your Travel Plans," Anchorage Daily News (Alaska), Apr. 28, 1996.*
"Smart tips make Oz travel easier," The Southlan Times (New Zealand), Aug. 29, 2001.*
"Sites to see: Do some chillin' at the North Pole," Sun-Sentinel, May 27, 2001.*
"Online booking site gets less annoying," The Dallas Morning News, Aug. 15, 1999.*

(Continued)

*Primary Examiner* — Rutao Wu
(74) *Attorney, Agent, or Firm* — Michael A. Glenn; Glenn Patent Group

(57) ABSTRACT

A travel system comprising a universal search feature and a local escapes feature is provided. The universal search feature gives an end user everything in a glance and in an organized fashion; the local escapes feature comprises at-a-glance compilation of things to do for the weekend in a specified area.

31 Claims, 8 Drawing Sheets

OTHER PUBLICATIONS

"A virtual hit parade of travel sites," The Toronto Star, Dec. 27, 1997.*

"Yahoo! Expands Yahoo! Get Local", PR Newswire. New York: Sep. 2, 1998.*

* cited by examiner

TRAVEL

BACKGROUND OF THE INVENTION

1. Technical Field

The invention relates to providing smart travel information. More particularly, the invention relates to two particular search features, a universal search and a local escape, wherein the user is provided with updated and dynamic travel information.

2. Description of the Prior Art

Travelers go to and use travel World Wide Web (web) sites for obtaining travel information. More specifically, there are a number of sites that provide travel information for a particular destination, such as, the city of Paris. Such sites are more or less simple lookups to static content. An end user enters a destination and is presented with results on web pages.

Some examples of simple lookup results on a web page, according to the prior art is discussed with reference to FIGS. 2 and 3. FIG. 2 shows a web page from Preview Travel presenting simple lookup results for the city of Paris. FIG. 3 shows a web page from Expedia.com™ presenting simple lookup results for the city of Paris.

What most companies typically do is create ready-made web pages. A good example concerns the concept of destination. Such companies create a web page that primarily has static links for a predetermined destination. Such service is what most of the industry is currently providing. Such companies basically build huge directories of static links.

Furthermore, the prior art references are concerned only with the concept of destination, as opposed to providing travel information on a variety of categories. For example, travelers sometimes travel due to an interest, as opposed to due solely to a particular destination. The prior art references typically prompt an end user for destination information. Dialog boxes or web pages present end users with input fields coupled to a label stating something to the effect of "Search for your destination by typing in . . . ."

It would be advantageous to provide dynamic travel information, as well as static travel information on a consistent and regular basis so that an end user can take advantage of all travel information.

It would be advantageous to provide the end user with different categories from which to choose in the end user's search for appropriate and useful travel information.

It would be advantageous to provide the end user with information that is categorized, organized, customized, and presented with the object of showing as much to the end user in as user-friendly way as possible, preferably on a minimum number of web pages as possible, so as to provide a good experience for the end user.

SUMMARY OF THE INVENTION

The invention provides two features to a proprietary travel system: a universal search feature and a local escapes feature.

The universal search feature comprises a travel search tool that gives the end user everything in a glance and in an organized fashion. The universal travel search feature is intended for all internal and external partners of the travel system. Current search results comprise, but are not limited to six categories: Destination guides, Canned keywords, Local events, Low air fares, Hot deals, and Lodging.

The local escapes feature comprises an at-a-glance compilation of things to do for the weekend in a specified area. The local escapes feature is planned for fifty predetermined cities. The local escapes feature is intended for all internal and external partners of the travel system. Features within local escapes comprise, but are not limited to Fare watch (air), Weekend E-Fares (air), Local events, Hot deals (lodging), Links to other cities, and Other resources, e.g. Maps & Resources.

DETAILED DESCRIPTION OF THE INVENTION

Figure 1:
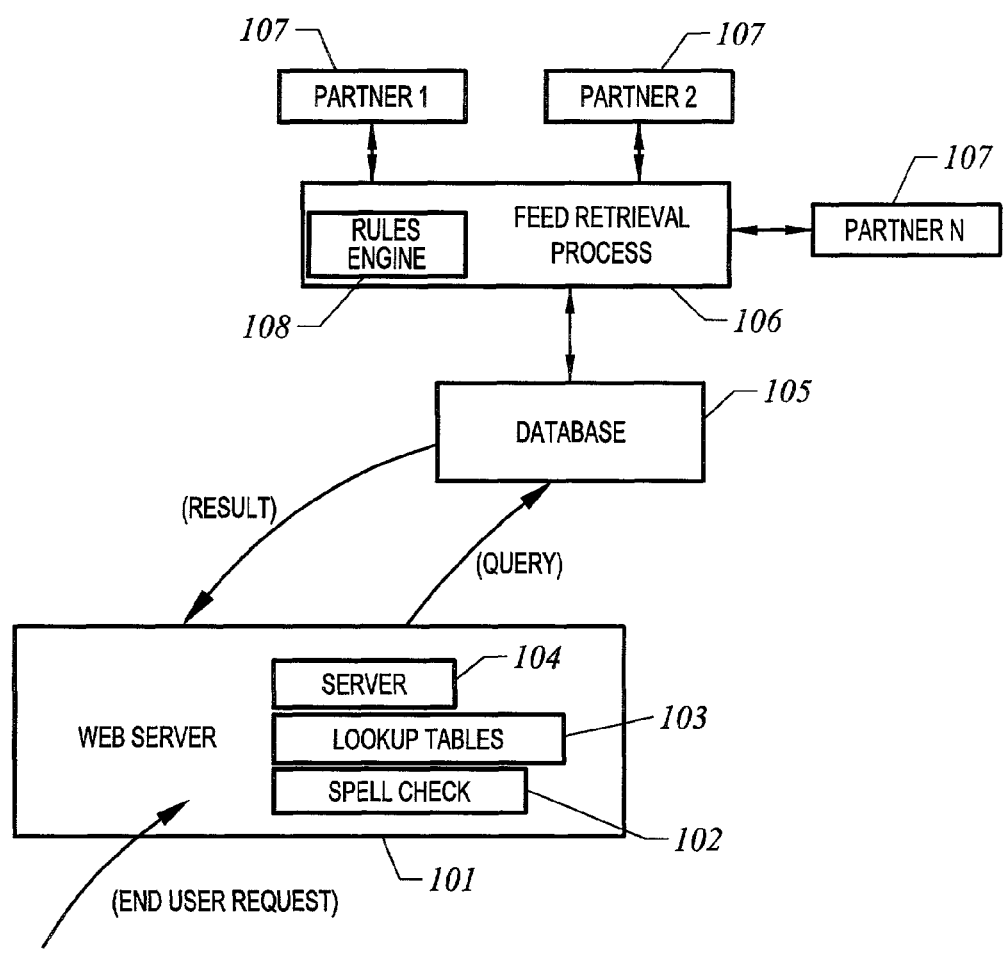
FIG. 1 shows a schematic diagram of the universal search system according to the invention.

The invention provides two features to a proprietary travel system: a universal search feature and a local escapes feature.

The universal search feature comprises a travel search mechanism that gives the end user everything in a glance and in an organized fashion. The universal travel search feature is intended to link to content of all internal and external partners of the travel system. Current search results comprise, but are not limited to six categories: destination guides, canned keywords, local events, low air fares, hot deals, and lodging.

The local escapes feature comprises an at-a-glance compilation of things to do for the weekend in a specified area. The local escapes feature, also referred simply as local escapes, preferably is planned for fifty predetermined cities. The local escapes feature is intended to link to content of all internal and external partners of the travel system. Categories within local escapes comprise, but are not limited to fare watch (air), weekend e-fares (air), local events, hot deals (lodging), links to other cities, and other resources, e.g. maps & resources.

Thus, the claimed invention comprises an intelligent way to display travel information from many varied sources, static and/or dynamic, and in a way that is coherent and consistent to the end user.

Universal Search.

The preferred embodiment of universal search comprises a multi-database search. Depending upon what an end user specifies, a context is determined for the end user. The claimed invention embeds a number of keywords that are then used to present to the end user travel related information, such as, for example, specific deals, categories, and other things of that nature. For example, if an end user types in the name of a city, then the claimed invention jumps to that particular city, however also pulling in information about low fares from various airports into that city, hotels, hotel deals that are specific to that city, car rentals, and the like. To a certain extent, the claimed invention anticipates the reason why the end user inputs the name of the city, i.e. what information the end user desires.

In another embodiment of the invention a predetermined list of major cities is provided, such as, for example, New York, San Francisco, and Orlando to use as a home city, the city from where the travel initiates. In another embodiment of the invention, when the end user does not provide the home city, the invention guesses a home location context from the set of predetermined cities.

Another equally preferred embodiment of the invention provides a predetermined list of home airports, whereby an end user can change the home airport by selecting from a pulldown list. Another embodiment of the invention guesses the home airport of the end user by using zip code information in a user profile of the end user.

It should be appreciated that the preferred embodiment of the invention comprises a one-to-one mapping of cities and airports.

The preferred embodiment of the invention presents a lot of different content in a categorized and organized way. The invention presents information that is static and dynamic, thus making the information as relevant as possible to the end user by having more information from which to choose. Thus, the end user can look at a variety of different categories, such as, for example, destination and/or interest.

An example of static information for the city of Paris is places to visit, which does not change over time. An example of dynamic information for the city of Paris is low fares from San Francisco to Paris, an event that is currently happening, a bargain, a package deal, and the like. Therefore, it should be appreciated that it is preferable that a combination of the static and dynamic information be presented and in such a way that the information is easy to look at.

The preferred embodiment of the invention comprises a search mechanism that determines the category for which the end user is requesting information. As the end user types in the word or phrase about which information is requested, the search mechanism figures out the appropriate category. For example, if the end user types in the word, skiing, the search mechanism determines skiing is an interest and not a destination, and pulls up the appropriate requested information. The claimed invention comprises at least the two categories, destination and interest.

Following is a preferred universal search algorithm according to the invention. An interest database is queried first. If there is a match, then information about interests is returned. If no match is found, then the destination database is queried. If a match is found, then information about that destination is returned. If no match is found, a spell checking tool, described in further detail below, is invoked.

It is should be appreciated that universal search also returns accurate and categorized information on predetermined keywords, such as, for example, "visa", "cars", and "hotels". Such keywords are added to the interest database and the interest database returns a match when an end user types in one of these keywords.

Also, if all these possibilities are exhausted, the search does a simple text search. That is, the end user receives information even if the end user entered a simple and/or non-travel specific search term such as "book".

The preferred embodiment of the invention comprises a spell checking tool. People often mistype and misspell words. The preferred embodiment of the invention comprises additional technology that suggests to the end user a word(s) intended by the end user. Essentially, the claimed invention guesses or anticipates what the end user wants. Also, the claimed invention preferably provides suggestions of possible spellings of a misspelled word.

Another example showing the use of the spell checking tool is when an end user types in LasVegas, i.e. with no spaces. The spell check tool determines that the end user intended the city, Las Vegas, and pulls up the appropriate information. Such a mistake is very common. The spell checking tool is intelligent enough to come back and actually show the end user results for Las Vegas, but it also preferably gives the end user suggestions for similarly sounding or similarly spelled words or phrases.

One embodiment of the invention assists the end user with entered city names that are ambiguous. For example, if an end user types in the name, San Jose, the end user is presented with a question prompting the end user to choose between the possibilities, San Jose, Calif., or San Jose, Costa Rica.

A preferred embodiment of the invention resolves ambiguity in the following manner. For example, if a user types Paris, in most cases such end user is referring to Paris, France and not Paris, Tex. The more popular cities, such as Paris, France are defined by a predetermined set of the top ambiguous cities. Using the predetermined set of top ambiguous cities, the universal search mechanism first displays a results page for the corresponding popular city, and presented on that results page is an option for the end user to view a list of the other cities.

According to the preferred embodiment of the invention, an end user types in a word, the spell check tool makes intelligent guesses about what the term is, a number of databases are queried, some of which store information that is static and some of which store information that is dynamic, and all disparate results are presented to the end user in one page, categorized in such a way that makes sense for the end user.

FIG. 1 is a schematic diagram showing the components of the preferred embodiment of the invention. An end user makes a request and the request is sent to a web server 101. Resident on the web server 101 is the spell check tool 102, look up tables 103, and search code 104.

Referring to FIG. 1, the end user enters in input to the web server 101 and the input gets passed to the spell checker tool 102, which returns a correct spelling for the end user, if necessary. Then the input is passed to lookup tables to help determine matches, such as if the entered city, San Jose, is San Jose, Costa Rica or San Jose, Calif. Control is passed to the search code which then passes a corresponding query to a database 105 that returns the result of the query back to the web server 101.

In the preferred embodiment of the invention, the database 105 is a single database with different tables coupled to a feed system 106 or feed retrieval process. The feed system 106 retrieves content preferably from different partners 107, using FTP. The content is then categorized, customized, and stored in the database 105.

The feed retrieval process preferably runs off of a rules-based engine 108. In one embodiment, the feeds are custom coded. That is, a predetermined format is supplied to partners 107 to process content into the predetermined format. XML is preferably used for the predetermined format because it is standard and universal. However, an equally preferred embodiment provides a more generic format for partners 107 to use. An exemplary example of XML parser rules is provided in the section, An Exemplary Example of XML Parser Rules, below.

Local Escapes.

The preferred embodiment of the invention comprises an implementation of the universal search referred to as local escapes. The idea is that instead of the end user being interested in a destination, the end user selects a home location. Local escapes then presents different kinds of information relevant to the current selected location to facilitate searches for the end user. For example, the local escapes feature might return the following information for a particular home location: a flight from the home location to popular destinations and/or events in the area of the home location.

The preferred embodiment of the invention provides a list from which the end user selects a home location. The list provided by the local escapes feature preferably has at least 50 cities from which the end user chooses a home location.

Another equally preferred embodiment of the invention provides a predetermined list of home airports, whereby an end user can change the home airport by selecting from a pulldown list. Another embodiment of the invention guesses the home airport of the end user by using zip code information in the profile of the end user.

The following examples compare the local escapes feature with the more general universal search. In a universal search, an end user enters a destination. The universal search system returns hotels in the relevant area and car rental activity, among other information. Whereas, the local escapes feature does not provide car rental activity, because the end user most likely does not need to rent a car for a home location. That is, in this example the local escapes feature filters out car rental activity. The same rationale is used to explain that local escapes preferably filters out hotel information for the home location.

It should be appreciated that the term, relevant, is subjective and that therefore, the local escapes feature and the universal search system may include or exclude categories based on an interpretation of relevance that may differ from other interpretations of the term.

It should be appreciated that events are extremely relevant to the end user using local escapes. Examples of relevant events are movies and concerts.

The preferred embodiment of the invention categorizes by urban regions information presented by the local escapes feature. Local escapes preferably comprises a multiple hierarchy of geographic regions. For example, one region is California and a region within California is Northern California. The multiple hierarchy of geographic regions may contain overlapping subcategories, for example, areas or items that are interrelated in terms of distance and relevancy.

As an example, the Lake Tahoe region of Northern California is very relevant to the San Francisco Bay Area even though it is actually a fair distance away, while Mount Shasta, on the other hand is not relevant.

An exemplary sample of a tree structure used for categorizing cities and regions is provided in the section, An Exemplary Sample of a Tree Structure Used for Categorizing Cities and Regions below.

The object is to organize events based on locality. As another example, if an end user is looking for events in San Francisco, the local escapes feature preferably presents information from other nearby and relevant cities, such as events in Berkeley, Oakland, and possibly San Jose. That is, the local escapes feature presents information from a super set.

In the World Wide Web (web) environment, it should be appreciated that the information is categorized, organized, and presented with the object of showing as much to the end user in a user-friendly way as possible on a minimum number of web pages, and preferably on a single web page. The system takes into consideration the constraint of presenting a lot of information in a relatively small space in such a way as to provide a good experience for the end user.

Figure 2:
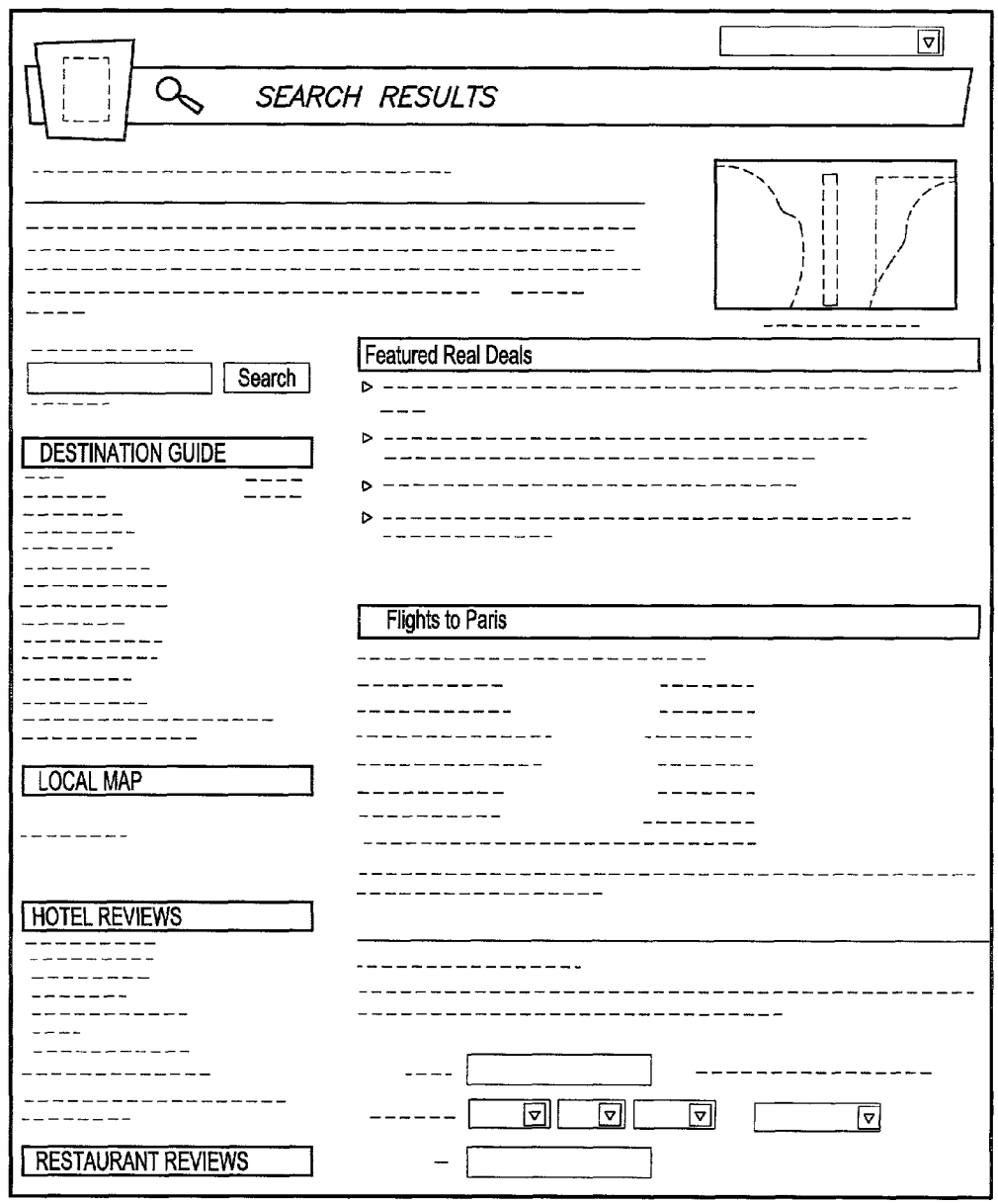
FIG. 2 shows a web page presenting search results for the city of Paris according to the prior art.
Figure 3:
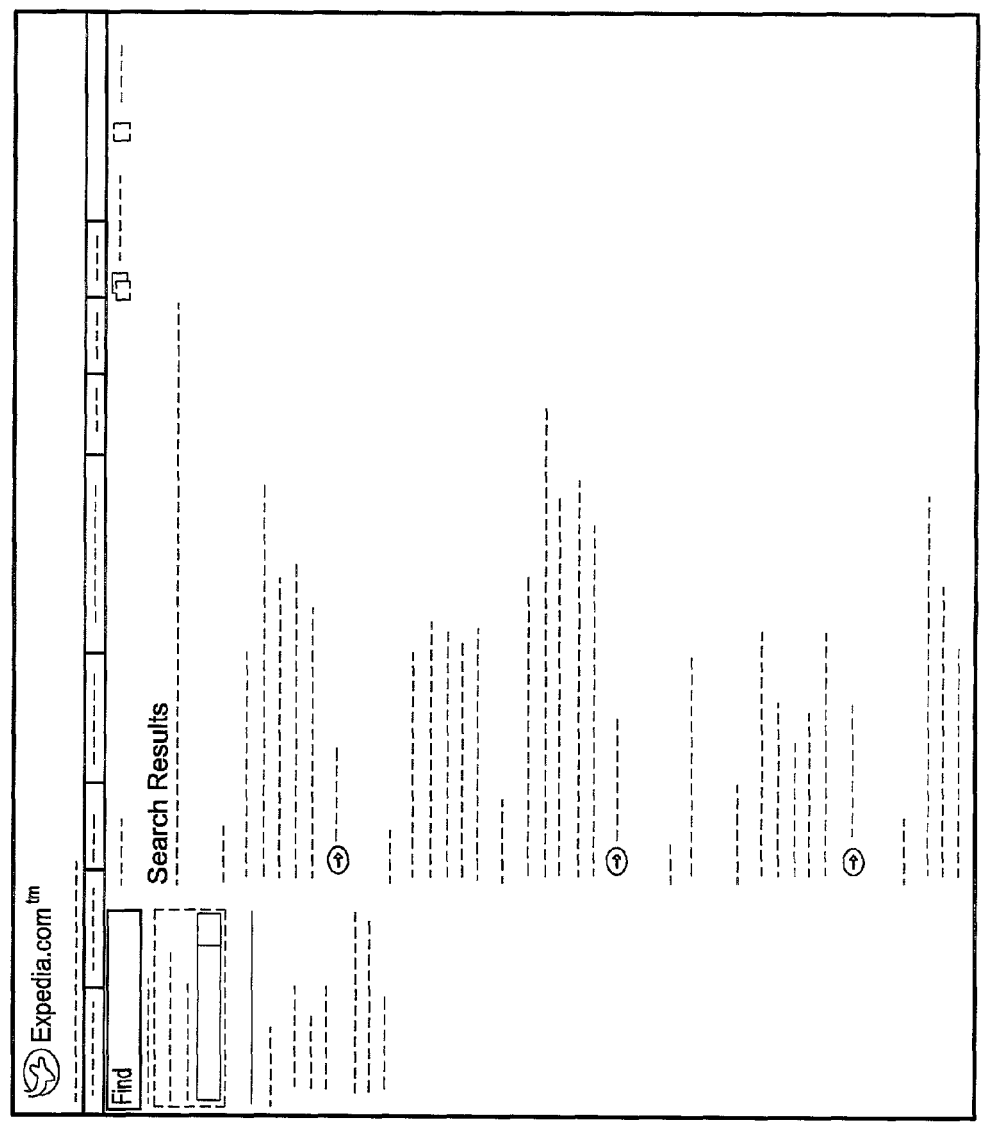
FIG. 3 shows a web page presenting search results for the city of Paris according to the prior art.

Some examples of search results on a web page, according to the prior art is discussed with reference to FIGS. 2 and 3. FIG. 2 shows a web page from Preview Travel presenting search results for the city of Paris. FIG. 3 shows a web page from Expedia.com™ presenting search results for the city of Paris. It is noted that the information presented in both prior art references is from static sources.

In contrast, the universal search system is a complete travel tool that gives end users everything, from both static as well as dynamic sources at a glance in an organized fashion. The local escapes feature provides an at-a-glance compilation of things to do for the weekend in a specified area.

Figure 4:
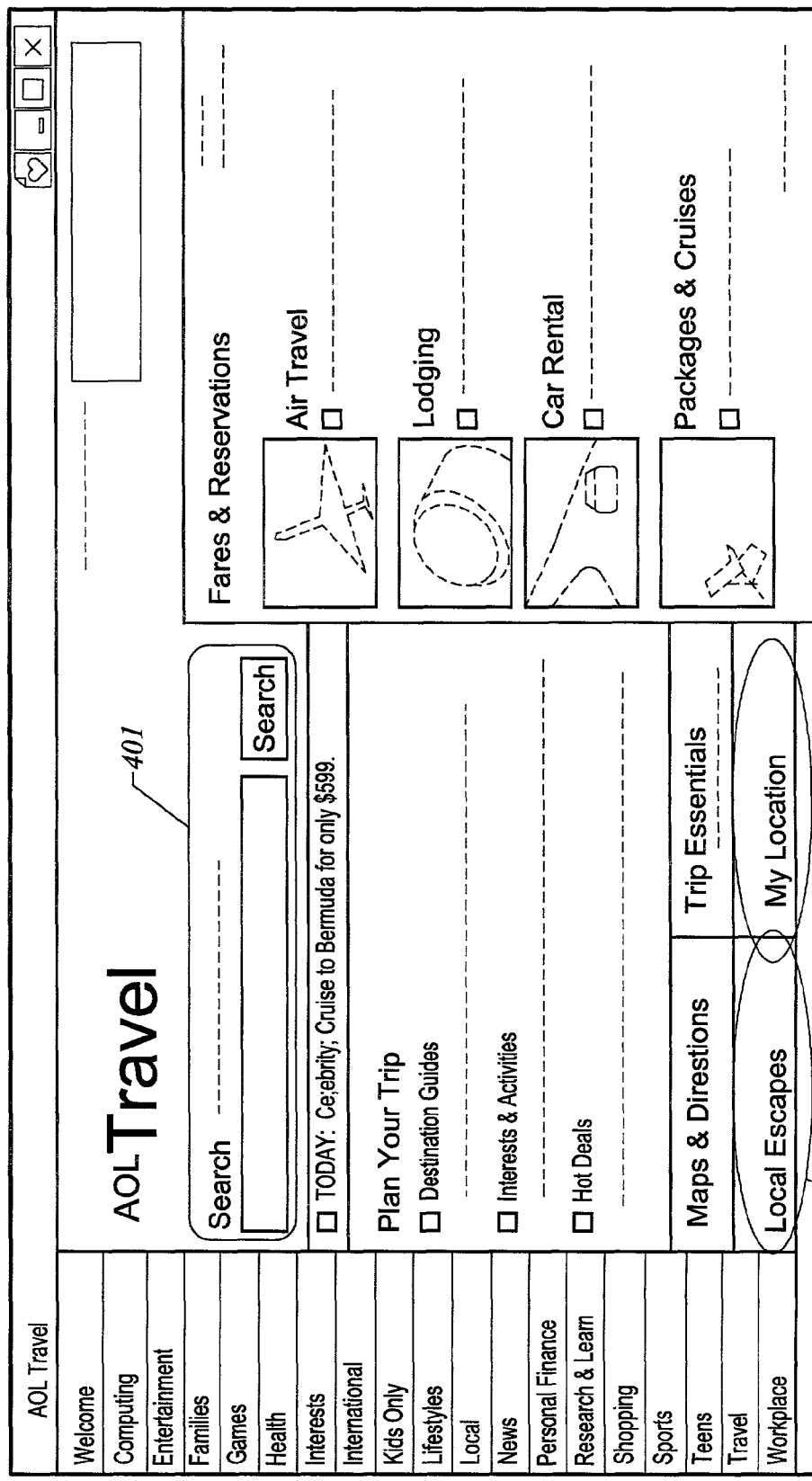
FIG. 4 shows an example of the main entry into the universal search system according to the invention.

FIG. 4 shows an example of the main entry 401 into the universal search system according to the invention. Also, an end user can choose to use the local escapes feature 402.

Figure 5:
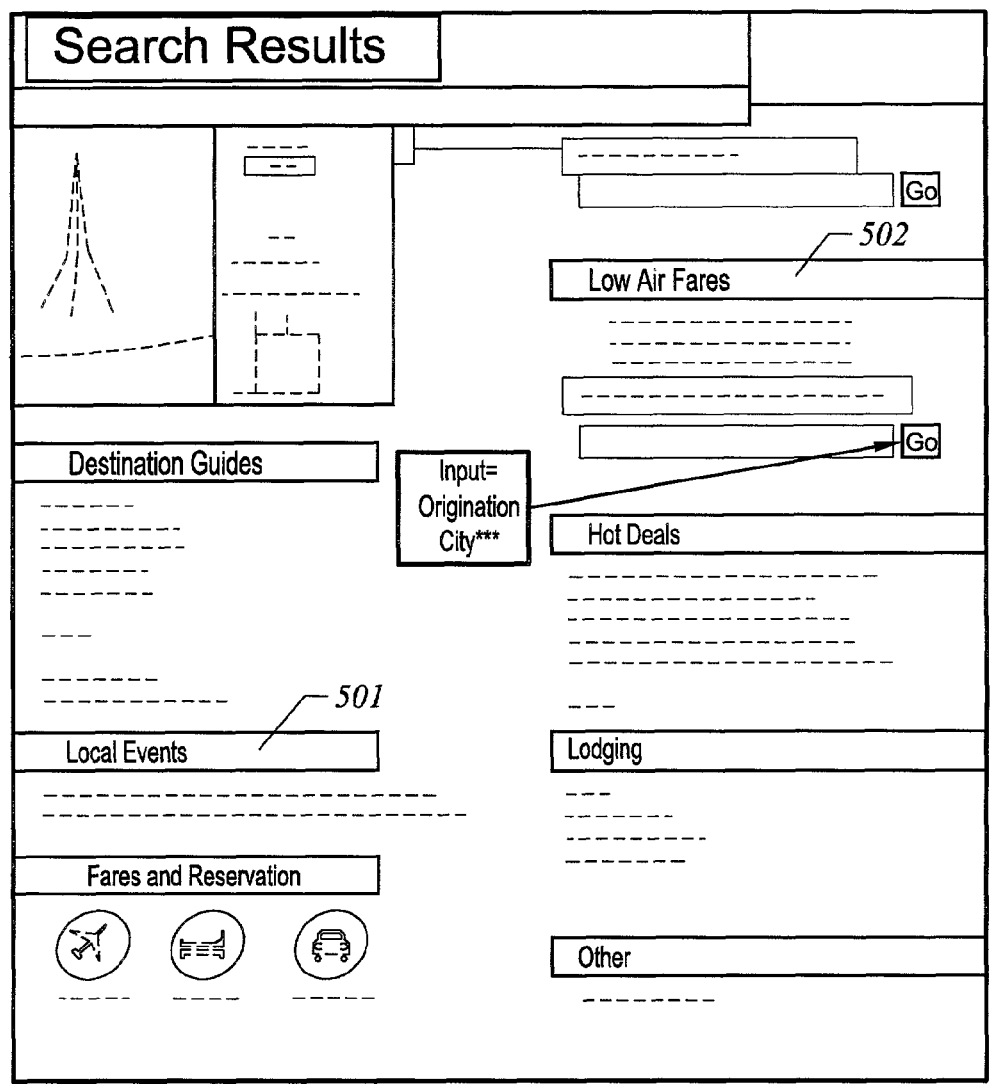
FIG. 5 is an example of a search results web page for a destination according to the invention.

FIG. 5 is an example of a search results web page for a destination according to the invention. In addition to a display of static information, information from dynamic sources are presented. Categories presenting dynamic information are Local Events 501 and Low Air Fares 502.

Figure 6:
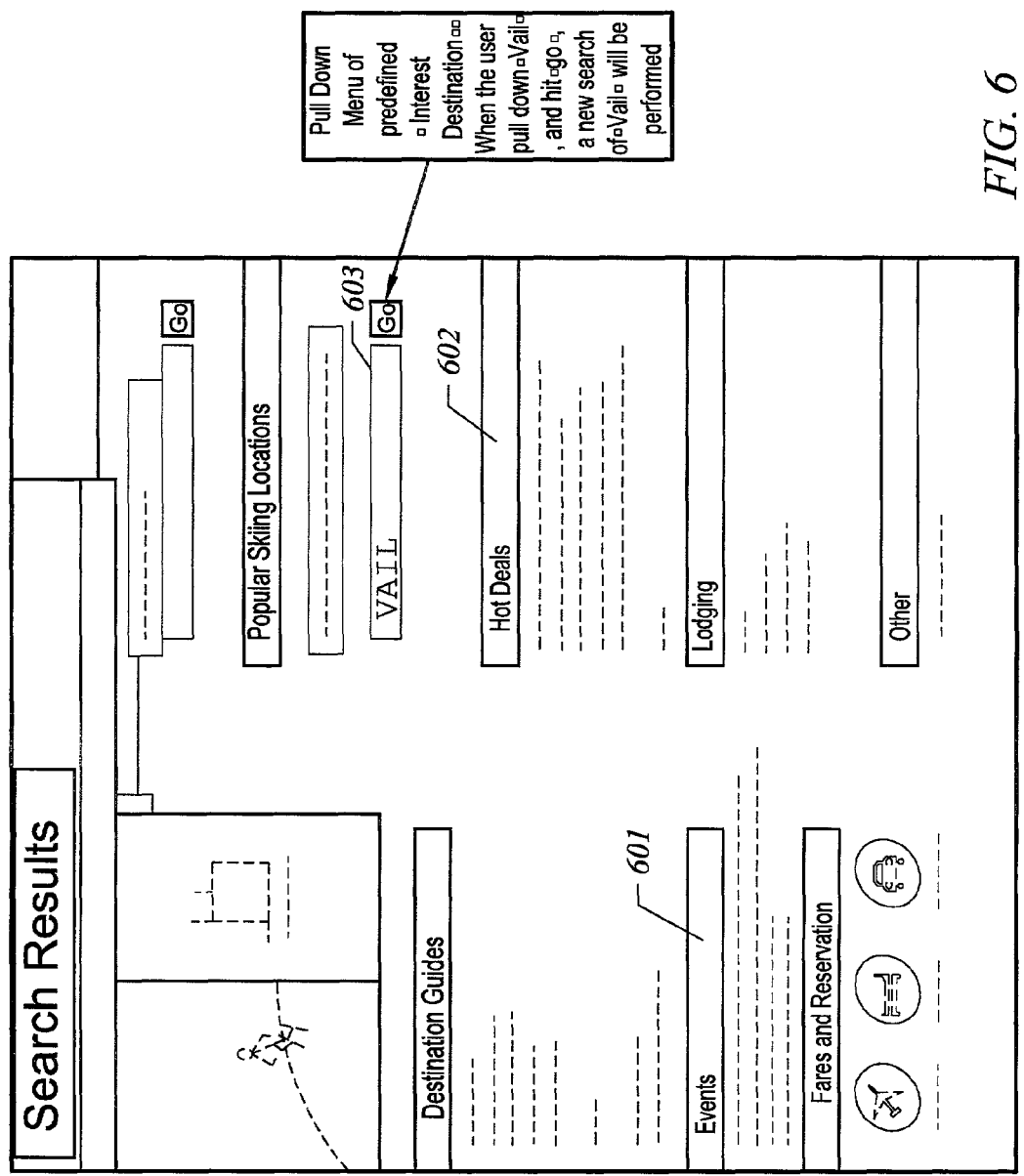
FIG. 6 is an example of a search results web page for an interest according to the invention.

FIG. 6 is an example of a search results web page for an interest according to the invention. That is, FIG. 6 shows an example of a search results web page for the interest, skiing. Again, in addition to a display of static information, information from dynamic sources are presented. Some categories presenting dynamic information are Events 601 and Hot Deals 602.

It should be appreciated that the system provides a list in a pulldown list box 603 of predefined interest destinations, such as the popular ski resort city of Vail.

Figure 7:
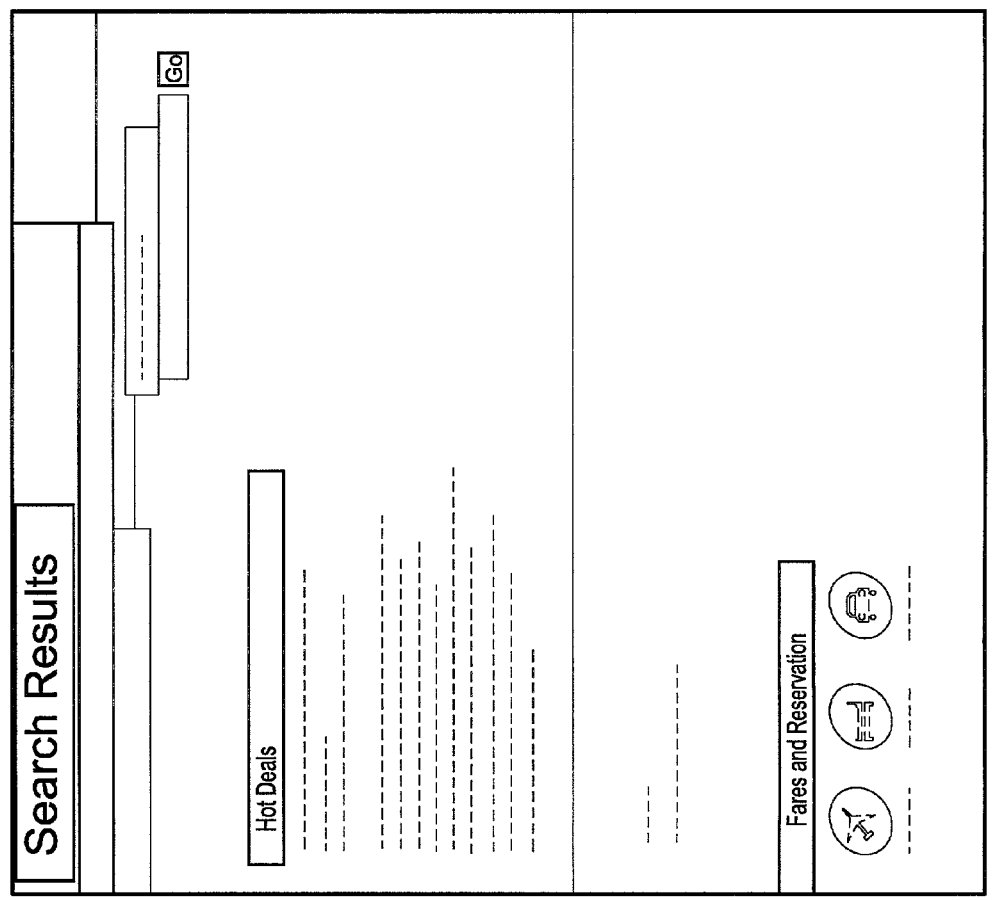
FIG. 7 is an example of a more page according to the invention.

FIG. 7 is an example of a more page, i.e. a page shown to an end user after clicking a more hyperlink. It should be appreciated that the example shows matches for a combination of two categories, namely, for a destination and for an interest. More specifically, FIG. 7 shows 27 matches for the search phrase, "skiing vail."

Figure 8:
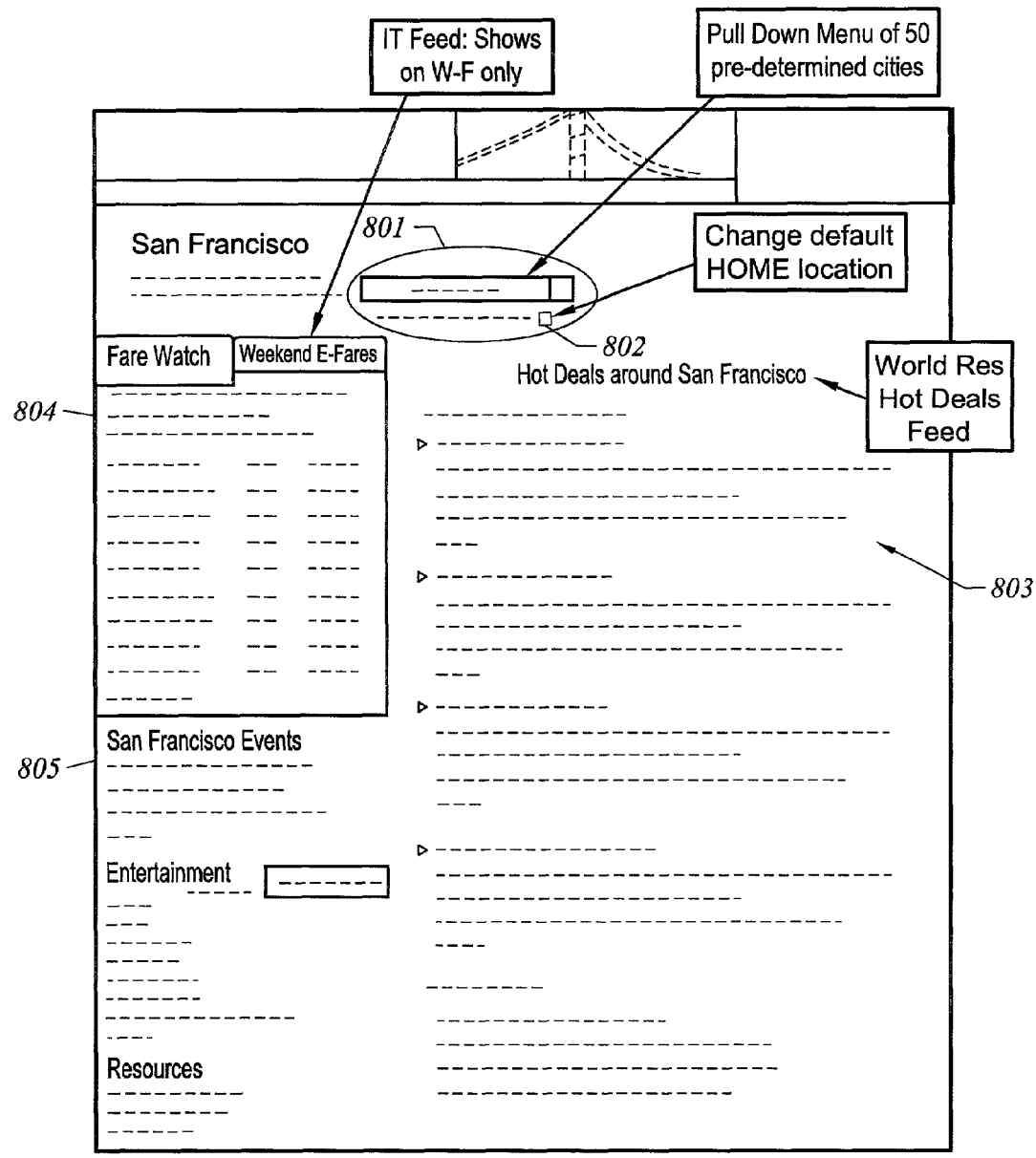
FIG. 8 is an example of a web page showing content of the local escapes feature according to the invention.

FIG. 8 is an example of a web page showing content of the local escapes feature according to the invention. The local area chosen is San Francisco. The web page has a pulldown list box 801 comprising a predetermined list of 50 cities. A checkbox 802 is provided for the end user to indicate that the selected city in the pulldown list box 801 is to be used as the default home location.

The preferred embodiment of the invention comprises a pulldown list box comprising a predetermined list of home airports for determining a home location. In addition, the local escapes feature guesses the home airport of the end user by using the zip code stored in the profile of the end user.

A Hot Deals section 803 displays pertinent information in and around interesting and relevant areas of San Francisco, such as Napa Valley, Lake Tahoe, and Carmel/Monterey.

It should be appreciated that information comprising static as well as dynamic is displayed preferably in a flexible fashion, as can be gleaned from the Fare Watch section 804. For example, weekend fares are displayed only on Wednesdays through Fridays so as not to clutter the web page unnecessarily on the other days for the end user.

Again, local events indigenous to the home location are displayed 805 for the delight of the end user. In this example, eclectic events, such as whale-watching and the Gilroy Garlic Festival are presented.

An Exemplary Sample of a Tree Structure Used for Categorizing Cities and Regions, as Applied to New York State. The state is broken down into the regions as follows:

New York:
    New York City, N.Y.;
    Long Island, N.Y.;
    Hudson Valley & The Catskills, N.Y.;
    Central Leatherstocking, N.Y.;
    Lake Placid & The Adirondacks, N.Y.;
    West Central N.Y. & The Finger Lakes;

Thousand Islands, Seaway, N.Y.; and
Capitol Area (including Saratoga Springs).
Central Leatherstocking (a region) is further broken down
into the following:
  Cooperstown, N.Y., United States;
  Oneida, N.Y., United States;
  Hobart, N.Y., United States;
  Herkimer, N.Y., United States; and
  Bainbridge, N.Y., United States.

An Exemplary Example of XML Parser Rules

Two types of exemplary rules are provided for the XML parser:

1) dtd rule (See example festivals.dtd in Table A). This rule is used by all XML parsers, is provided by the feed provider, and is a technical requirement for all XML parsers; and 2) mapping rules (See example fes_events_map.xml also in Table A), created such that the XML parser takes the raw data and outputs the data in a format that can be stored into the database and used by the search engine.

TABLE A

```
<!ENTITY deg "j">
<!ELEMENT festivals.data (CALENDAREVENT)>
<!ELEMENT CALENDAREVENT (EVENT+)>
<!ELEMENT EVENT (EVENTNAME, STARTDATE,
ENDDATE, DURATION?,
INFOPHONE, EMAIL*,
INFOFAX, URL*, DESCRIPTION, PERFORMERS*,
CATEGORY+, SUBCATEGORY?,
SUBJECT?, VENUE,
VENUECITY, VENUESTATE, EVENTZIP?, EVENTCOUNTRY?,
ORGANIZATION* )>
<!ATTLIST EVENT EVENTID ID #REQUIRED>
<!ELEMENT EVENTNAME (#PCDATA)>
<!ATTLIST EVENTNAME length CDATA #FIXED "70">
<!ELEMENT STARTDATE (#PCDATA)>
<!ATTLIST STARTDATE dateFormat NMTOKEN #FIXED "MDY">
<!ELEMENT ENDDATE (#PCDATA)>
<!ATTLIST ENDDATE dateFormat NMTOKEN #FIXED "MDY">
<!ELEMENT DURATION (#PCDATA)>
<!ELEMENT INFOPHONE (#PCDATA)>
<!ELEMENT EMAIL (#PCDATA)>
<!ATTLIST EMAIL length CDATA #FIXED "50">
<!ELEMENT INFOFAX (#PCDATA)>
<!ELEMENT URL (#PCDATA)>
<!ATTLIST URL protocol NMTOKEN #FIXED "HTTP">
<!ELEMENT DESCRIPTION (#PCDATA)>
<!ATTLIST DESCRIPTION length CDATA #FIXED "755">
<!ELEMENT PERFORMERS (#PCDATA)>
<!ELEMENT CATEGORY (#PCDATA)>
<!ELEMENT SUBCATEGORY (#PCDATA)>
<!ELEMENT SUBJECT (#PCDATA)>
<!ELEMENT VENUE (#PCDATA)>
<!ELEMENT VENUECITY (#PCDATA)>
<!ATTLIST VENUECITY length CDATA #FIXED "50">
<!ELEMENT VENUESTATE (#PCDATA)>
<!ELEMENT EVENTZIP (#PCDATA)>
<!ELEMENT EVENTCOUNTRY (#PCDATA)>
<!ELEMENT ORGANIZATION (#PCDATA)>
<!--Feed Mapping for Festival.com Events -->
<FEEDMAPPER INPUTFORMAT="xml"
RECORD_ DELIMITER="}" FIELDDELIMITER="|"
PARTNER="Festival.com" CATEGORY="Events">
<!--HEAD LINE-->
<!-- This contains the Head line -->
<RULE>
  <OUTPUT TAGNAME="HEADLINE"/>
  <INPUT COLUMNNO="2" CDATA="Yes"/>
</RULE>
<!--Start Date-->
<RULE>
  <INPUT COLUMNNO="3"/>
  <OUTPUT TAGNAME="START_DATE"/>
</RULE>
<!--End Date-->
<RULE>
```

TABLE A-continued

```
  <INPUT COLUMNNO="5"/>
  <OUTPUT TAGNAME="END_DATE"/>
</RULE>
<!--Preparing the URL-->
<RULE>
  <INPUT COLUMNNO="9"/>
  <OUTPUT TAGNAME="URL"/>
</RULE>
<!--Preparing the Description -->
<RULE>
  <!--Description-->
  <INPUT COLUMNNO="10"/>
  <OUTPUT TAGNAME="DESCRIPTION"/>
</RULE>
<!--PHONE-->
<RULE>
  <INPUT COLUMNNO="6"/>
  <OUTPUT TAGNAME="PHONE"/>
</RULE>
<!--EMAIL-->
<RULE>
  <INPUT COLUMNNO="7"/>
  <OUTPUT TAGNAME="EMAIL"/>
</RULE>
<!--FAX-->
<RULE>
  <INPUT COLUMNNO="8"/>
  <OUTPUT TAGNAME="FAX"/>
</RULE>
<!--PERFORMERS-->
<RULE>
  <INPUT COLUMNNO="11"/>
  <OUTPUT TAGNAME="PERFORMERS"/>
</RULE>
<!--CATEGORY-->
<RULE>
  <INPUT COLUMNNO="12"/>
  <OUTPUT TAGNAME="CATEGORY"/>
</RULE>
<!--SUBCATEGORY-->
<RULE>
  <INPUT COLUMNNO="13"/>
  <OUTPUT TAGNAME="SUBCATEGORY"/>
</RULE>
<!--SUBJECT-->
<RULE>
  <INPUT COLUMNNO="14"/>
  <OUTPUT TAGNAME="SUBJECT"/>
</RULE>
<!--ADDRESS-->
<RULE>
  <INPUT COLUMNNO="15"/>
  <OUTPUT TAGNAME="ADDRESS"/>
</RULE>
<!--DEST_CITY-->
<RULE>
  <INPUT COLUMNNO="16"/>
  <OUTPUT TAGNAME="DEST_CITY"/>
</RULE>
<!--PERFORMERS-->
<RULE>
  <INPUT COLUMNNO="11"/>
  <OUTPUT TAGNAME="PERFORMERS"/>
</RULE>
<!--DEST_STATE-->
<RULE>
  <INPUT COLUMNNO="17"/>
  <OUTPUT TAGNAME="DEST_STATE"/>
</RULE>
<!--DEST ZIP-->
<RULE>
  <INPUT COLUMNNO="18"/>
  <OUTPUT TAGNAME="DEST_ZIP"/>
</RULE>
<!--DEST_COUNTRY-->
<RULE>
  <INPUT COLUMNNO="19"/>
  <OUTPUT TAGNAME="DEST_COUNTRY"/>
</RULE>
<!--ORGANIZATION-->
```

TABLE A-continued

```
<RULE>
  <INPUT COLUMNNO="20"/>
  <OUTPUT TAGNAME="ORGANIZATION"/>
</RULE>
</FEEDMAPPER>
```

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A system for providing travel information to an end user in an intelligent way using a search result, said system comprising:
a user database configured for storing user profile information including users' zip codes;
a regional information database containing information relating to a plurality of cities;
a local events feed retrieval system comprising:
a rules-based engine for obtaining local event information relating to said plurality of cities from a plurality of external partners via custom codes in XML format; and
a local event feed retrieval database configured to process said local event information relating to said plurality of cities;
a server operatively coupled with said user database, said regional information database, and said local events feed retrieval system, wherein said server is configured to receive a request for travel information from the end user and configured to determine said end user's home location by referencing said user's zip code in said user database, wherein said home location is determined to be one city from among the plurality of cities that is the closest to said user's zip code;
a context determination module configured to determine a context from said received request for travel information automatically, depending only on what said end user requests;
wherein said context determination module processes a user entered phrase using a search mechanism to simultaneously determine both:
travel destination information relevant to said end user, wherein travel destination information includes only designation information about said user's home location and the three closest cities, from among the plurality of cities, to the user's home location; and
at least one user-interest that corresponds to said received requests; and
a searching module configured to search for a plurality of search results based said context, wherein each search result from among said plurality of search result comprises each of:
logistical travel information relating to said travel destination; and
location-specific, interest-dependent, and dynamic information corresponding to local events held in said user's home location and the three closest cities, from among the plurality of cities, to the user's home location;
wherein said server is further configured to return said plurality of search results to the end user via a browser-based interface, wherein said plurality of search results are organized by both:
the city in which said local events occur; and
the relative distance that said region, city, and urban area is from said home location.

2. The system of claim 1, said server further comprising:
a spell check tool for providing a spell check service to an end user for assisting an end user in providing correct spelling of said request for travel information.

3. The system of claim 2, wherein said spell check tool further comprises any of:
means for suggesting alternate spellings of a word in said request for travel information;
means for providing similarly spelled words or relevant phrases; and
means for settling ambiguity among said word with other words or phrases having similar parts of said word.

4. The system of claim 1, further comprising:
lookup tables for determining matches to facilitate processing said request for travel information.

5. The system of claim 1, said context determination module further comprising:
a plurality of context determining categories; and
means for determining at least one context determining category.

6. The system of claim 1, said search result comprising: the following travel categories:
destination guides;
canned keywords;
hot deals; and
lodging.

7. The system of claim 6, wherein said local events comprise at least a concert.

8. The system of claim 1, wherein said location-specific, interest-dependent, and dynamic information comprises any of:
a hot deal; and
a fare watch.

9. The system of claim 1, wherein said server is a web server and said travel information is presented in one web page.

10. The system of claim 9, wherein said one web page comprises:
a more link for facilitating linking to more detailed information as an option.

11. The system of claim 10, wherein said more detailed information comprises information reflecting and associated with at least one context determining category.

12. The system of claim 1, wherein said provided travel information comprises any of:
a fare watch;
weekend e-fares;
local events;
hot deals;
links to other cities; and
maps.

13. The system of claim 1, further comprising:
means for filtering out travel information not relevant to said home location.

14. The system of claim 1, further comprising:
a multi-hierarchical schema for organizing geographical regions to facilitate determining relevant travel information, wherein content in said regions overlap.

15. The system of claim 14, wherein geographical regions comprise urban regions.

16. The system of claim 15, wherein said urban regions comprise content from other nearby and relevant cities associated with said home location.

17. The system of claim 1, further comprising:
a multi-hierarchical schema for organizing at least one geographical region to facilitate determining relevant travel information,
wherein said multi-hierarchical schema comprises levels of a state, a region within said state, and cities within said region.

18. A method implemented in hardware for providing travel information to an end user in an intelligent way using a search result, said method comprising:
storing user profile information including users' zip codes in a user database;
storing information relating to a plurality of cities in a regional information database;
providing a local events feed retrieval system comprising a rules-based engine for said obtaining local event information relating to said plurality of cities from a plurality of internal and external partner via custom codes in XML format;
providing a local events feed retrieval database configured to process said local event information relating to said plurality of cities;
receiving a request for travel information from the end user via a server operatively coupled with said user database and said regional information database;
automatically determining said end user's home location by referencing said user's zip code in said database, wherein said home location is determined to be one city from among the plurality of cities that is the closet to said user's zip code;
processing said request into a query;
automatically determining a context from said received request for travel information in the form of both:
travel destination information relevant to said end user, wherein travel destination information includes only designation information about said end user's home location and the three closest cities, from among the plurality of cities, to said user's home location; and
at least one user-interest that corresponds to said received request for travel information,
wherein said step of automatically determining said phrase context, depends only on said request for travel information,
automatically searching a plurality of databases according to both said query and said context for a search result, without any interaction with a human agent, wherein said search result comprises each of:
logistical travel information relating to said travel destination; and
location-specific, interest-dependent, and dynamic information corresponding to local events held in the vicinity of said travel destination; and
returning said search result to the end user via a browser-based interface, wherein said plurality of search results are organized by both:
the city in which said local events occur; and
the relative distance that said region, city, and urban area is from said home location.

19. The method of claim 18, further comprising:
providing a spell check service to an end user for assisting an end user in providing correct spelling of an intended word in said request for travel information.

20. The method of claim 19 further comprising:
suggesting alternate spellings of said word;
providing similarly spelled words or relevant phrases; and
settling ambiguity among said word with other words or phrases having similar parts of said word.

21. The method of claim 18, further comprising:
providing lookup tables for determining matches to facilitate processing said request into said query.

22. The method of claim 18 further comprising:
analyzing a plurality of context determining categories; and
determining at least one context determining category.

23. The method of claim 18, wherein said search result comprises the following travel categories:
destination guides;
canned keywords;
hot deals; and
lodging.

24. The method of claim 18, wherein said location-specific, interest-dependent, and dynamic information further comprises any of:
hot deal; and
a fare watch.

25. The method of claim 18 further comprising:
providing said travel information to said end user in one web page.

26. The method of claim 25, wherein said one web page comprises:
a more link for facilitating linking to more detailed information as an option.

27. The method of claim 26, wherein said more detailed information comprises information reflecting and associated with one or more than one of said context determining categories.

28. The method of claim 18, wherein said provided travel information comprises, a local escape category comprising any of:
a fare watch;
weekend e-fares;
hot deals;
links to other cities; and
maps.

29. The method of claim 18, further comprising:
providing a multi-hierarchical schema for organizing geographical regions to facilitate determining relevant travel information, wherein content in said regions overlap.

30. The method of claim 29, wherein geographical regions comprise urban regions.

31. The method of claim 30, wherein said urban regions comprise content from other nearby and relevant cities associated with said home location.

* * * * *